US012770518B2

(12) United States Patent
Bandi et al.

(10) Patent No.: US 12,770,518 B2
(45) Date of Patent: Oct. 20, 2026

(54) SYSTEM AND METHOD OF JOINING AN EXISTING AUTOMATED VEHICLE MARSHALING CONVOY USING WIRELESS COMMUNICATION

(71) Applicant: Ford Motor Company, Dearborn, MI (US)

(72) Inventors: Krishna Bandi, Novi, MI (US); Meghna Menon, Ann Arbor, MI (US); Mario Anthony Santillo, Canton, MI (US); Gregory P. Linkowski, Dearborn, MI (US)

(73) Assignee: Ford Motor Company, Dearborn, MI (US)

( * ) Notice: Subject to any disclaimer, the term of this patent is extended or adjusted under 35 U.S.C. 154(b) by 215 days.

(21) Appl. No.: 18/518,074

(22) Filed: Nov. 22, 2023

(65) Prior Publication Data

US 2024/0185724 A1 Jun. 6, 2024

Related U.S. Application Data

(60) Provisional application No. 63/430,504, filed on Dec. 6, 2022.

(51) Int. Cl.
*G08G 1/00* (2006.01)
*G05D 1/00* (2024.01)
*H04W 4/44* (2018.01)

(52) U.S. Cl.
CPC ............. *G08G 1/22* (2013.01); *G05D 1/0293* (2013.01); *H04W 4/44* (2018.02)

(58) Field of Classification Search
CPC ......... G08G 1/22; G05D 1/0293; H04W 4/44; H04W 4/46
See application file for complete search history.

(56) References Cited

U.S. PATENT DOCUMENTS

2020/0410868 A1 12/2020 Bouillon et al.
2021/0056854 A1* 2/2021 Ucar .................... G05D 1/0295
2021/0084460 A1 3/2021 Yang et al.
2021/0385865 A1 12/2021 Mueck et al.
2022/0007379 A1* 1/2022 Cao .......................... H04W 4/40
2022/0038554 A1 2/2022 Merwaday et al.
2022/0063621 A1* 3/2022 Austin ................. G06V 20/584
2022/0086218 A1 3/2022 Sabella et al.
2022/0178705 A1* 6/2022 Tarkiainen ............... G08G 1/22
2022/0244743 A1* 8/2022 Ganlath ............. G06Q 30/0283
2022/0269288 A1* 8/2022 Cui ......................... B60L 53/36
2022/0337481 A1 10/2022 Guim Bernat et al.
2023/0052717 A1* 2/2023 Harris .................. G05D 1/0293
2023/0145508 A1 5/2023 Kaphengst et al.

FOREIGN PATENT DOCUMENTS

DE 112019005425 7/2021
WO 2019130280 8/2019
WO 2021226062 11/2021

* cited by examiner

*Primary Examiner* — Navid Z. Mehdizadeh
*Assistant Examiner* — Shelley Marie Osterhout
(74) *Attorney, Agent, or Firm* — Burris Law, PLLC

(57) ABSTRACT

A method for transmitting a request to join a marshaling convoy, receiving routing-localization information in response to the request, and controlling one or more subsystems within a vehicle to enter a marshaling convoy based on the routing-localization information and a marshaling message, wherein the marshaling message causes the marshaling convoy to accommodate the vehicle.

20 Claims, 10 Drawing Sheets

SYSTEM AND METHOD OF JOINING AN EXISTING AUTOMATED VEHICLE MARSHALING CONVOY USING WIRELESS COMMUNICATION

CROSS-REFERENCE TO RELATED APPLICATION

This application claims the benefit of and priority to U.S. Provisional Application No. 63/430,504, filed on Dec. 6, 2022, and titled "SYSTEM AND METHOD OF JOINING AN EXISTING AUTOMATED VEHICLE MARSHALLING CONVOY USING WIRELESS COMMUNICATION", the contents of which are incorporated herein by reference in its entirety.

FIELD

The present disclosure relates to marshaling vehicles in a defined area. More specifically, the present disclosure relates to accommodating a new vehicle to join an existing automated vehicle marshaling convoy.

BACKGROUND

The statements in this section merely provide background information related to the present disclosure and may not constitute prior art.

Current standards, like those proposed by European Telecommunications Standards Institute (ETSI) or Society of Automotive Engineers (SAE), do not provide solutions for the automatic vehicle on-boarding for marshaling/guiding one or more vehicles without the involvement of a manual operator. The involvement of the manual operator for each vehicle could lead to delays in the vehicle marshaling, which can lead to delays of marshaling when the same vehicle intends to support multiple marshaling features, such as plant marshaling, depot marshaling, valet parking assist marshaling, electric vehicle charging marshaling, geo-fenced use-cases, etc.

The present disclosure addresses these and other issues related to marshaling vehicles.

SUMMARY

This section provides a general summary of the disclosure and is not a comprehensive disclosure of its full scope or all of its features.

The present disclosure provides a method comprising: transmitting, by a vehicle system of a vehicle to an infrastructure system, a request to join a marshaling convoy, wherein the request is transmitted via a wireless communication system; receiving, by the vehicle system from the infrastructure system, routing-localization information in response to the request, wherein the routing-localization information provides a route for the vehicle to join the marshaling convoy; and controlling, by the vehicle system, one or more sub-systems within the vehicle to cause the vehicle to enter the marshaling convoy based on the routing-localization information and a marshaling message, wherein the marshaling message causes the marshaling convoy to accommodate the vehicle; wherein the request identifies, by using one or more vehicle sensors of the vehicle, a current location of the vehicle, snap-shot information associated with the current location of the vehicle, or a combination thereof; wherein the routing-localization information is calculated based on a distance of the vehicle from a marshaling zone area, wherein the marshaling zone area includes the marshaling convoy; further comprising: identifying, by a smart marshaling algorithm of the vehicle, a current marshaling infrastructure message; and displaying data indicative of a type of marshaling that is associated with the marshaling convoy, wherein the display of the data is based on the identification of the current marshaling infrastructure message; further comprising: validating a permission associated with the routing-localization information, wherein the permission includes one or more instructions indicative of whether the request is in one of an accepted status, a rejected status, or a stand-by status; and wherein the control of the one or more sub-systems within the vehicle to cause the vehicle to enter the marshaling convoy is further based on a permission, received from the infrastructure system, indicative of an accepted status.

The present disclosure provides a system comprising: an infrastructure system configured to: receive a request to join a marshaling convoy, wherein the request is received via a wireless communication system, transmit routing-localization information in response to the request, wherein the routing-localization information provides a route for a vehicle to join the marshaling convoy; and a vehicle system configured to: transmit the request to join the marshaling convoy, receive the routing-localization information in response to the request, and control one or more sub-systems within the vehicle to cause the vehicle to enter the marshaling convoy based on the routing-localization information and a marshaling message, wherein the marshaling message causes the marshaling convoy to accommodate the vehicle; wherein the request identifies, by using one or more vehicle sensors of the vehicle, a current location of the vehicle, snap-shot information associated with the current location of the vehicle, or a combination thereof; wherein the infrastructure system is further configured to: determine, based on a distance of the vehicle from a marshaling zone area, the routing-localization information, wherein the marshaling zone area includes the marshaling convoy; wherein the vehicle system is further configured to: identify, by a smart marshaling algorithm of the vehicle, a current marshaling infrastructure message; and display data indicative of a type of marshaling that is associated with the marshaling convoy, wherein the display of the data is based on the identification of the current marshaling infrastructure message; wherein the vehicle system is further configured to: validate a permission associated with the routing-localization information, wherein the permission includes one or more instructions indicative of whether the request is in one of in an accepted status, a rejected status, or a stand-by status; wherein the control of the one or more sub-systems within the vehicle to cause the vehicle to enter the marshaling convoy is further based on a permission, received from the infrastructure system, indicative of an accepted status; wherein the infrastructure system is further configured to: generate the marshaling message for current vehicles in the marshaling convoy; and transmit the marshaling message to the vehicle system, wherein the transmission of the marshaling message is based on the generation of the marshaling message; and wherein the marshaling message causes a speed and routing-localization of current marshaling vehicles of the marshaling convoy to be adjusted, and wherein the marshaling message creates an unaltered smart contract of a marshaling convoy negotiation.

The present disclosure provide one or more non-transitory computer-readable media storing processor-executable instructions that, when executed by at least one processor, cause the at least one processor to: transmit, by a vehicle system of a vehicle to an infrastructure system, a request to join a marshaling convoy, wherein the request is transmitted via a wireless communication system; receive, by the vehicle system from the infrastructure system, routing-localization information in response to the request, wherein the routing-localization information provides a route for the vehicle to join the marshaling convoy; and control, by the vehicle system, one or more sub-systems within the vehicle to cause the vehicle to enter the marshaling convoy based on the routing-localization information and a marshaling message, wherein the marshaling message causes the marshaling convoy to accommodate the vehicle; wherein the request identifies, by using one or more vehicle sensors of the vehicle, a current location of the vehicle, snap-shot information associated with the current location of the vehicle, or a combination thereof; wherein the routing-localization information is calculated based on a distance of the vehicle from a marshaling zone area, wherein the marshaling zone area includes the marshaling convoy; wherein the at least one processor is further caused to: identify, by a smart marshaling algorithm of the vehicle, a current marshaling infrastructure message; and display data indicative of a type of marshaling that is associated with the marshaling convoy, wherein the display of the data is based on the identification of the current marshaling infrastructure message; wherein the at least one processor is further caused to: validate a permission associated with the routing-localization information, wherein the permission includes one or more instructions indicative of whether the request is in one of an accepted status, a rejected status, or a stand-by status; and wherein the control of the one or more sub-systems within the vehicle to cause the vehicle to enter the marshaling convoy is further based on a permission, received from the infrastructure system, indicative of an accepted status.

In one form, the present disclosure is directed to a method of marshaling vehicles in an area. The method includes: transmitting, by a vehicle system for a vehicle to an infrastructure system, a marshaling request to join an identified convoy; receiving, by the vehicle system from the infrastructure system, routing-localization information, where the routing-localization information provides a route for the vehicle to join the identified convoy; generating and transmitting, by the infrastructure system, a marshaling message for current vehicles in the identified convoy, where the marshaling message includes information for controlling the identified convoy to accommodate the vehicle; and controlling, by the vehicle system, sub-systems within the vehicle to have the vehicle enter the identified convoy based on the routing-localization information.

Further areas of applicability will become apparent from the description provided herein. It should be understood that the description and specific examples are intended for purposes of illustration only and are not intended to limit the scope of the present disclosure.

DRAWINGS

In order that the disclosure may be well understood, there will now be described various forms thereof, given by way of example, reference being made to the accompanying drawings, in which.

Figure 1:
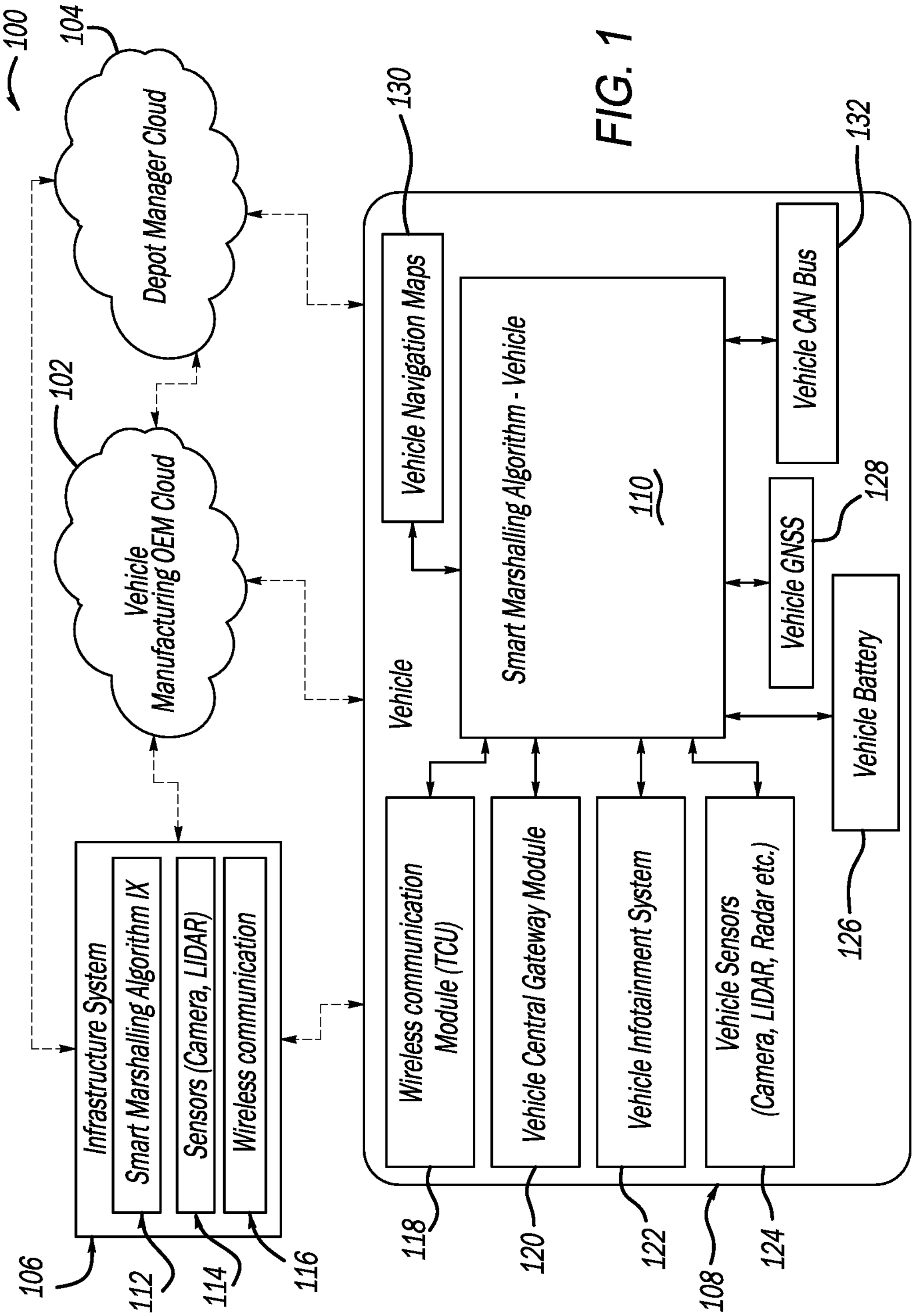
FIG. 1 illustrates an overall system for automated vehicle marshaling in accordance with various implementations.

The drawings described herein are for illustration purposes only and are not intended to limit the scope of the present disclosure in any way.

DETAILED DESCRIPTION

The following description is merely exemplary in nature and is not intended to limit the present disclosure, application, or uses. It should be understood that throughout the drawings, corresponding reference numerals indicate like or corresponding parts and features.

One or more herein described examples provide a means for joining (e.g., adding a new vehicle to) an existing automated vehicle marshaling convoy using wireless communication. Triggers or enablement are provided to include an automatic vehicle on-boarding for the marshaling of one or more vehicles without the involvement of a manual operator based on the ETSI and SAE standards. By providing a wireless means for the facilitation of a new vehicle joining an existing convoy of marshaled vehicles, delays in the vehicle marshaling created by the utilization of the manual operator are mitigated. Potential delays of marshaling when the same vehicle would like to provide support for multiple features of marshaling (e.g., plant marshaling, depot marshaling, valet parking assist marshaling, electric vehicle charging marshaling, geo-fenced use cases, etc.) are also mitigated by providing a wireless means for the facilitation of a new vehicle joining an existing convoy of marshaled vehicles. Additionally, common wireless or wired technology issues and synchronization issues present before a vehicle joins the marshaling of an infrastructure are mitigated.

In one or more examples, a method is also provided for when a vehicle needs to perform certain operations at a plant or a depot or a valet during an ignition-ON and/or wake-up scenario by the implementation of the wireless means for the facilitation of a new vehicle joining an existing convoy of marshaled vehicles. Furthermore, by providing a wireless means for the facilitation of a new vehicle joining an existing convoy of marshaled vehicles, onboarding a vehicle into an existing marshaling convoy and system can occur prior to full vehicle assembly via vehicle-to-everything identification to the system (e.g., at the end of chassis before tires are fully installed).

FIG. 1 shows a schematic block diagram illustration of an automated vehicle marshaling (AVM) system 100. In one or more examples, the AVM system 100 marshals one or more vehicles traveling at a low speed. However, it is understood that the AVM system 100 may marshal one or more vehicles traveling at any speed. It is also understood that the AVM system 100 may marshal semi-autonomous vehicles and/or fully autonomous vehicles.

The AVM system 100 generally includes a vehicle manufacturing original equipment manufacturer (OEM) cloud system 102, a depot manager cloud system 104, an infrastructure system 106, and a vehicle 108. The vehicle manufacturing OEM cloud system 102 operates as the central cloud system that manages and/or facilitates any manufacturing process associated with the vehicle 108. The vehicle manufacturing OEM cloud system 102 wirelessly communicates with the depot manager cloud system 104 and the infrastructure system 106. The vehicle manufacturing OEM cloud system 102 also wirelessly communicates with the vehicle 108. In one or more examples, one or more different wireless communication protocols may be employed for establishing wireless communication between the systems (e.g., cellular, TCP/IP, V2X protocol, I2X protocol, among others).

The vehicle manufacturing OEM cloud system 102 may include controllers, computing devices, servers, modems, and/or other components for performing the various functions described herein. Additionally, the vehicle manufacturing OEM cloud system 102 may include an algorithm for processing information and/or facilitating for the marshaling of the one or more vehicles. The vehicle manufacturing OEM cloud system 102 is configured to store data associated with each vehicle manufactured by the OEM. The data associated with each vehicle may include, but is not limited to a vehicle identification number, data related to components installed in the vehicle (e.g., a bill of material with part numbers), one or more software-based tasks to be performed on the vehicle such as software configurations, and/or diagnostics test to be performed, etc. The vehicle manufacturing OEM cloud system 102 is configured to process status information associated with each vehicle of the one or more vehicles (e.g., the vehicle 108). The vehicle manufacturing OEM cloud system 102 is also configured to remotely control each vehicle of the one or more vehicles by utilizing, for example, I2X communication (e.g., on-boarding, re-onboarding, or off-boarding sessions messages). More particularly, the vehicle manufacturing OEM cloud system 102 is configured to: remotely activate/wake-up the vehicle 108 if it is in a power-off state and/or activate and deactivate a vehicle-side smart marshaling algorithm 110 associated with the vehicle 108. The vehicle manufacturing OEM cloud system 102 Is further configured to serve as an in-between interface. For example, if the infrastructure system 106 and/or depot manager cloud system 104 are not able to communicate with the vehicle 108, the infrastructure system 106 and/or depot manager cloud system 104 may communicate with the vehicle 108 via the vehicle manufacturing OEM cloud system 102.

The depot manager cloud system 104 may include controllers, computing devices, servers, modems, and other components. Additionally, the depot manager cloud system 104 may include an algorithm for processing information associated with the status of each vehicle of the one or more vehicles, for example. The depot manager cloud system 104 is configured to wirelessly communicate directly with the infrastructure system 106. The depot manager cloud system 104 is also configured to: provide instructions for where each vehicle of the one or more vehicles need to be for day-to-day and/or hourly activities; trigger activation/deactivation of the vehicle-side smart marshaling algorithm 110 associated with the vehicle 108; and/or receive updates on activities performed by the vehicle 108 from the infrastructure system 106. The depot manager cloud system 104 is further configured to provide instructions associated with each vehicle of the one or more vehicles to the infrastructure system 106 such as loading of the vehicle, unloading of the vehicle, charging the vehicle, etc. Based on any the information communicated from the depot manager cloud system 104 to the infrastructure system 106, the infrastructure system 106 is configured to autonomously marshal each of the one or more vehicles.

The infrastructure system 106 includes an infrastructure-side (IX-side) smart marshaling algorithm 112, a sensor component 114, and a wireless communication component 116. It is understood that the wireless communication component 116 may be a sensor controller, for example. It is also understood that the infrastructure system 106 may include other modules and/or components for performing the various operations herein. The wireless communication component 116 provides for communication between the infrastructure system 106 and the one or more vehicles (e.g., the vehicle 108). For example, the wireless communication component 116 may utilize GPS, Wi-Fi, satellite, 3G/4G/5G, and/or Bluetooth™ to communicate with the one or more vehicles.

The wireless communication component 116 also communicates with the sensor component 114. The sensor component 114 communicates with a set of infrastructure sensors (e.g., a set of infrastructure sensors 202) such as, for example, one or more cameras, lidar, radar, and/or ultrasonic devices. The sensor component 114 monitors the movement of the one or more vehicles as the vehicle(s) move through the factory floor or the parking lot, for example. As another example, the infrastructure system 106 utilizes the IX-side smart marshaling algorithm 112 to process and send information to the vehicle manufacturing OEM cloud system 102 and/or to process information received from the vehicle manufacturing OEM cloud system 102. As another example, the infrastructure system 106 utilizes the IX-side smart marshaling algorithm 112 to process and send information directly to the vehicle 108 and/or to process information received from the vehicle 108. As an additional example, the infrastructure system 106 utilizes the IX-side smart marshaling algorithm 112 to process and send information directly to the depot manager cloud system 104 and/or to process information received from the depot manager cloud system 104. It is understood that the infrastructure system 106 can forward instructions received from the vehicle manufacturing cloud 102 to the vehicle 108. However, it is also understood that the infrastructure system 106 can send instructions to the vehicle 108 directly.

The vehicle 108 includes the vehicle-side smart marshaling algorithm 110, a wireless communication module 118, a vehicle central gateway module 120, a vehicle infotainment system 122, one or more vehicle sensors 124, a vehicle battery 126, a vehicle global navigation satellite system (GNSS) 128, vehicle navigation maps 130, and a vehicle controller area network (CAN) bus 132. It is understood that the vehicle 108 may include other modules and/or components for performing the various operations herein. The wireless communication module 118 may be a transmission control unit (TCU). The wireless communication module 118 includes one or more sensors that are configured to gather data and send signals to other components of the vehicle 108. The one or more sensors of the wireless communication module 118 may include a vehicle speed sensor (not shown) configured to determine a current speed of the vehicle 108; a wheel speed sensor (not shown) configured to determine if the vehicle 108 is traveling at an incline or a decline; a throttle position sensor (not shown) determines if a downshift or upshift of one or more gears associated with the vehicle 108 is required in a current status of the vehicle 108; and/or a turbine speed sensor (not shown) configured to send data associated with a rotational speed of a torque converter of the vehicle 108. The wireless communication module 118 communicates information, gathered by the one or more sensors, to the vehicle-side smart marshaling algorithm 110. In one embodiment, the vehicle-side smart marshaling algorithm 110 may be disposed as a component within the wireless communication module 118. For example, the vehicle 108 utilizes the vehicle-side smart marshaling algorithm 110 to process and send information gathered by the one or more sensors to the infrastructure system 106. As another example, the vehicle 108 utilizes the vehicle-side smart marshaling algorithm 110 to process and send information gathered by the one or more sensors to the vehicle manufacturing OEM cloud system 102 directly. The vehicle-side smart marshaling algorithm 110 is configured to communicate information and/or instructions to the wireless communication module 118 received from the infrastructure system 106 and/or the vehicle manufacturing OEM cloud system 102.

The vehicle central gateway module 120 operates as an interface between various vehicle domain bus systems, such as an engine compartment bus (not shown), an interior bus (not shown), an optical bus for multimedia (not shown), a diagnostic bus for maintenance (not shown), or the vehicle CAN bus 132. The vehicle central gateway module 120 is configured to distribute data communicated to the vehicle central gateway module 120 by each of the various domain bus systems to other components of the vehicle 108. The vehicle central gateway module 120 is also configured to distribute information received from the vehicle-side smart marshaling algorithm 110 to the various domain bus systems. The vehicle central gateway module 120 is further configured to send information to the vehicle-side smart marshaling algorithm 110 received from the various domain bus systems. For example, the vehicle 108 utilizes the vehicle-side smart marshaling algorithm 110 to process and send information received from the vehicle central gateway module 120 to the infrastructure system 106. As another example, the vehicle 108 utilizes the vehicle-side smart marshaling algorithm 110 to process and send information received from the vehicle central gateway module 120 to the vehicle manufacturing OEM cloud system 102 directly. The vehicle-side smart marshaling algorithm 110 is configured to communicate information and/or instructions to the vehicle central gateway module 120 received from the infrastructure system 106 and/or the vehicle manufacturing OEM cloud system 102.

The vehicle infotainment system 122 is a system that delivers a combination of information and entertainment content and/or services to a user of the vehicle 108. It is also understood that the vehicle infotainment system 122 can deliver information services to anyone associated with the vehicle 108, in other examples. As an example, the vehicle infotainment system 122 includes built-in car computers that combine one or more functions, such as digital radios, built-in cameras, and/or televisions.

The vehicle infotainment system 122 communicates information associated with the built-in car computers or processors to the vehicle-side smart marshaling algorithm 110. For example, the vehicle 108 utilizes the vehicle-side smart marshaling algorithm 110 to process and send information received from the vehicle infotainment system 122 to the infrastructure system 106. As another example, the vehicle 108 utilizes the vehicle-side smart marshaling algorithm 110 to process and send information received from the vehicle infotainment system 122 to the vehicle manufacturing OEM cloud system 102 directly. The vehicle-side smart marshaling algorithm 110 is configured to communicate information and/or instructions to the vehicle infotainment system 122 received from the infrastructure system 106 and/or the vehicle manufacturing OEM cloud system 102.

The one or more vehicle sensors 124 can include one or more of cameras, lidar, radar, and/or ultrasonic devices. For example, ultrasonic devices utilized as the one or more vehicle sensors 124 emit a high frequency sound wave that hits an object (e.g., a wall or another vehicle) and is then reflected back to the vehicle 108. Based on the amount of time it takes for the sound wave to return to the vehicle 108, the vehicle 108 can determine the distance between the one or more vehicle sensors 124 and the object. As another example, camera devices utilized as the one or more vehicle sensors 124 provide a visual indication of a space around the vehicle 108. As an additional example, radar devices utilized as the one or more vehicle sensors 124 emit electromagnetic wave signals that hit the object and is then reflected back to the vehicle 108. Based on the amount of time it takes for the electromagnetic waves to return to the vehicle 108, the vehicle 108 can determine a range, velocity, and angle of the vehicle 108 relative to the object.

The one or more vehicle sensors 124 communicate information associated with the position and/or distance at which the vehicle 108 is relative to the object to the vehicle-side smart marshaling algorithm 110. For example, the vehicle 108 utilizes the vehicle-side smart marshaling algorithm 110 to process and send information received from the one or more vehicle sensors 124 to the infrastructure system 106. As another example, the vehicle 108 utilizes the vehicle-side smart marshaling algorithm 110 to process and send information received from the one or more vehicle sensors 124 to the vehicle manufacturing OEM cloud system 102 directly. The vehicle-side smart marshaling algorithm 110 is configured to communicate information and/or instructions to the one or more vehicle sensors 124 received from the infrastructure system 106 and/or the vehicle manufacturing OEM cloud system 102.

The vehicle battery 126 is controlled by a battery management system (not shown) that provides instructions to the vehicle battery 126. For example, the battery management system provides instructions to the vehicle battery 126 based on a temperature of the vehicle battery 126. However, it is understood that the battery management system may provide instructions to the vehicle battery 126 based on any measure associated with the vehicle battery 126 such as power state of the vehicle 108, a time period of at least one day that the vehicle 108 is in an off-state, or a combination thereof. The battery management system ensures acceptable current modes of the vehicle battery 126. For example, the acceptable current modes protect against overvoltage, overcharge, and/or overheating of the vehicle battery 126. As another example, the temperature of the vehicle battery 126 indicates to the battery management system whether any of the acceptable current modes are within acceptable temperate ranges. The battery management system associated with the vehicle battery 126 communicates information associated with the temperature of the vehicle battery 126 to the vehicle-side smart marshaling algorithm 110. For example, the vehicle 108 utilizes the vehicle-side smart marshaling algorithm 110 to process and send information received regarding the vehicle battery 126 to the infrastructure system 106. As another example, the vehicle 108 utilizes the vehicle-side smart marshaling algorithm 110 to process and send information regarding the vehicle battery 126 to the vehicle manufacturing OEM cloud system 102 directly. The vehicle-side smart marshaling algorithm 110 is configured to communicate information and/or instructions to the vehicle battery 126 received from the infrastructure system 106 and/or the vehicle manufacturing OEM cloud system 102.

The vehicle GNSS 128 is configured to communicate with satellites so that the vehicle 108 can determine a specific location of the vehicle 108. The vehicle navigation maps 130 can display, via a display screen (not shown), the specific location of the vehicle 108 to the user. The vehicle GNSS 128 communicates geographical information associated with the vehicle 108 to the vehicle-side smart marshaling algorithm 110. For example, the vehicle 108 utilizes the vehicle-side smart marshaling algorithm 110 to process and send information received from the vehicle GNSS 128 to the infrastructure system 106. As another example, the vehicle 108 utilizes the vehicle-side smart marshaling algorithm 110 to process and send information from the vehicle GNSS 128 to the vehicle manufacturing OEM cloud system 102 directly. The vehicle-side smart marshaling algorithm 110 is configured to communicate information and/or instructions to the vehicle GNSS 128 received from the infrastructure system 106 and/or the vehicle manufacturing OEM cloud system 102. As another example, the vehicle 108 utilizes the vehicle-side smart marshaling algorithm 110 to process and send information associated with the vehicle navigation maps 130 to the infrastructure system 106. As another example, the vehicle 108 utilizes the vehicle-side smart marshaling algorithm 110 to process and send information from the vehicle navigation maps 130 to the vehicle manufacturing OEM cloud system 102 directly. The vehicle-side smart marshaling algorithm 110 is configured to communicate information and/or instructions to the vehicle navigation maps 130 received from the infrastructure system 106 and/or the vehicle manufacturing OEM cloud system 102.

The vehicle CAN bus 132 is configured to allow any device within the network of the vehicle 108 to create a data frame that is transmitted sequentially. For example, the vehicle CAN bus 132 is configured to prioritize the further distribution of transmission received from different components within the vehicle 108. As another example, the vehicle CAN bus 132 organizes the transmission received from the different components within the vehicle 108 so that an unlimited amount of transmitted data is not distributed at a single time. For example, the vehicle 108 utilizes the vehicle-side smart marshaling algorithm 110 to process and send information received regarding the vehicle CAN bus 132 to the infrastructure system 106. As another example, the vehicle 108 utilizes the vehicle-side smart marshaling algorithm 110 to process and send information regarding the vehicle CAN bus 132 to the vehicle manufacturing OEM cloud system 102 directly. The vehicle-side smart marshaling algorithm 110 is configured to communicate information and/or instructions to the vehicle CAN bus 132 received from the infrastructure system 106 and/or the vehicle manufacturing OEM cloud system 102.

Figure 2:
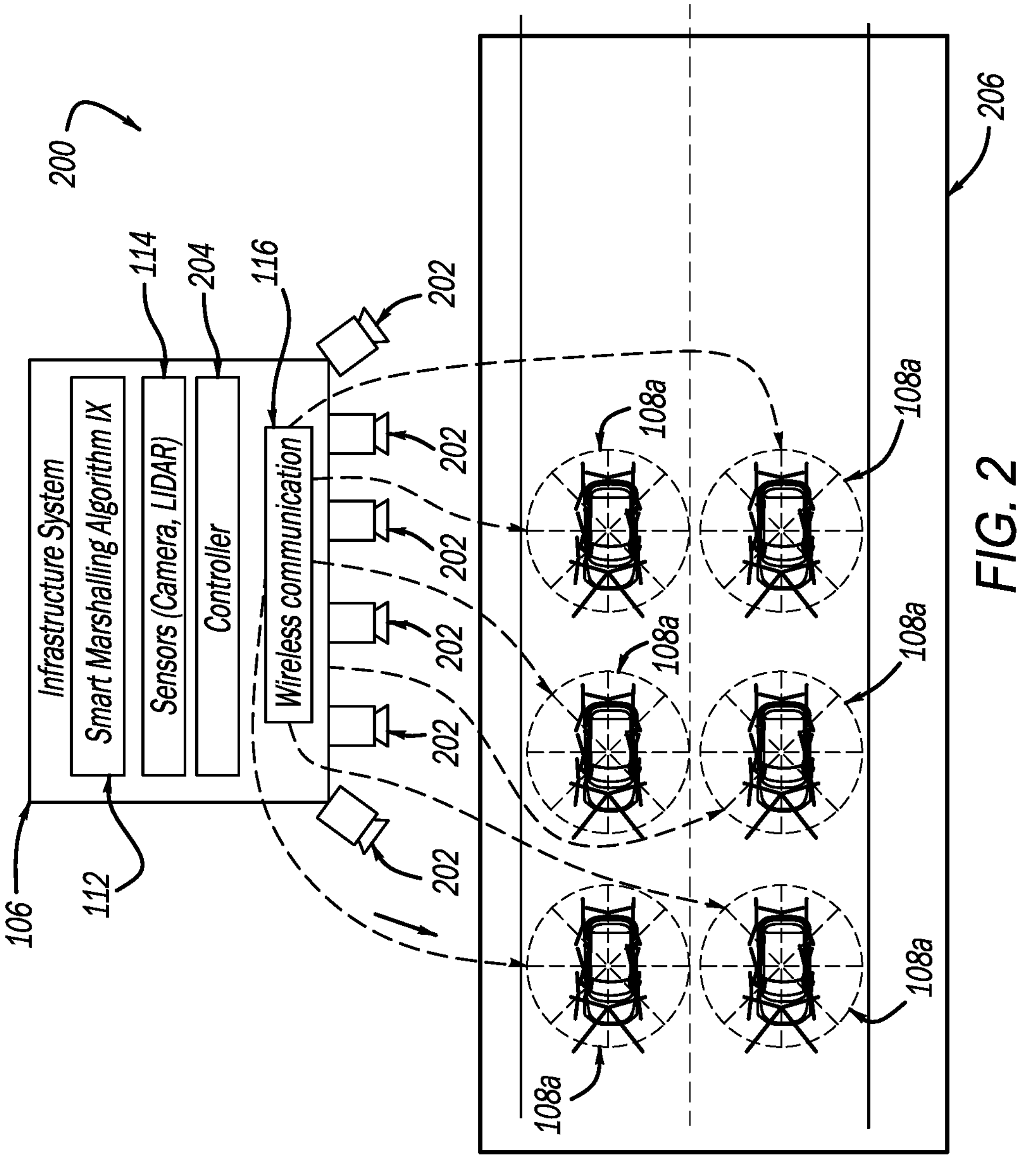
FIG. 2 illustrates a system for distribution of a fleet of vehicles within a current marshaling convoy zone in accordance with various implementations.

Referring now to FIG. 2, there is shown an example AVM system 200. The system 200 includes the infrastructure system 106. The infrastructure system 106 further includes the sensor component 114 that communicates with the set of infrastructure sensors 202 such as, for example, one or more cameras, lidar, radar, and/or ultrasonic devices. The sensors 202 monitor the movement of the one or more vehicles 108 as the one or more vehicles 108 move through, for example, the factory floor. The infrastructure system 106 also includes the wireless communication component 116 that provides for communication between the infrastructure system 106 and the one or more vehicles 108. Additionally, the infrastructure system 106 includes an infrastructure controller 204. The infrastructure controller 204 is configured to centrally control the operation of each of the one or more vehicles 108. For example, the operation of each of the one or more vehicles 108 includes propulsion, braking, and steering of the one or more vehicles 108. It is understood that the infrastructure controller 204 may be disposed within the infrastructure system 106 or externally located relative to the infrastructure system 106. Also depicted in FIG. 2 is a plurality of vehicles 108*a* that are marshaled within a marshaling zone area 206 within a convoy. The infrastructure system 106 wirelessly broadcasts a marshaling infrastructure-message to each vehicle of the plurality of vehicles 108*a*. For example, the marshaling infrastructure-message is broadcasted over a vehicle-to-everything (V2X) protocol. However, it is understood that any communication means may be used to broadcast the marshaling infrastructure-message.

Figure 3:
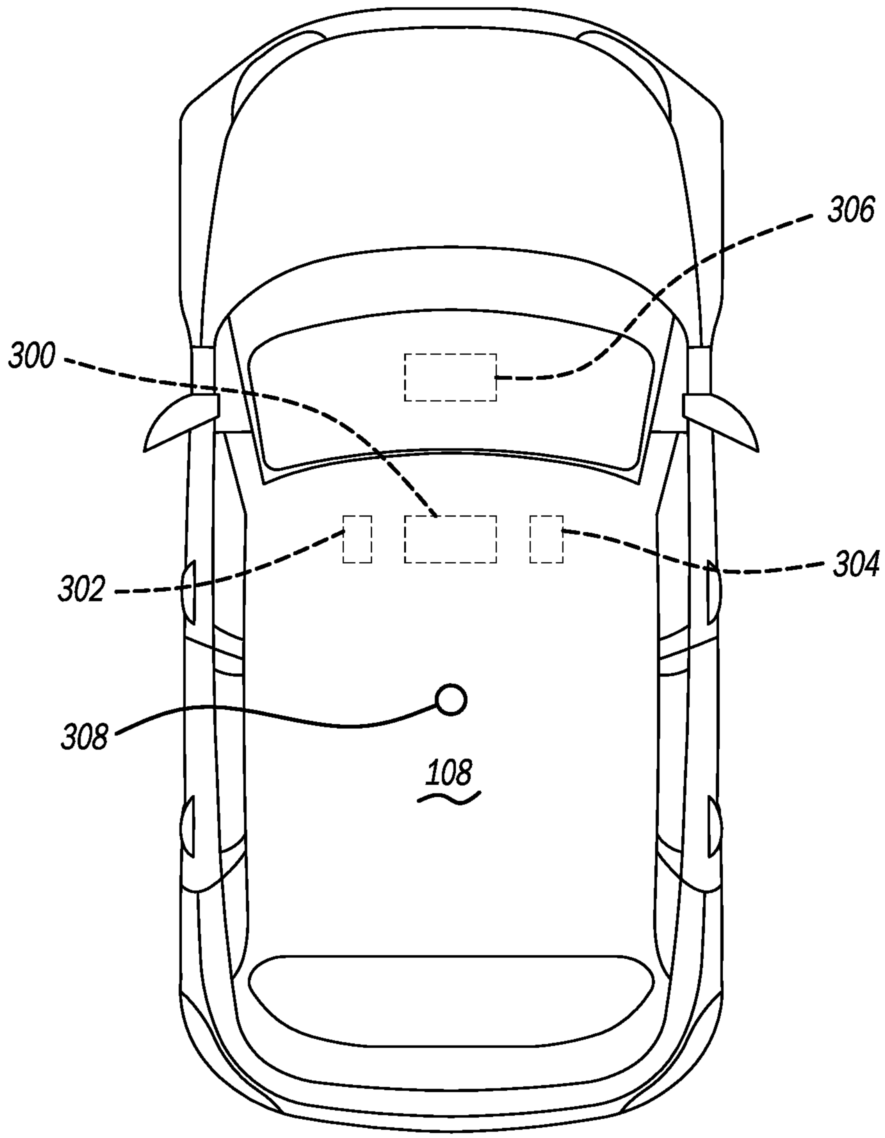
FIG. 3 illustrates an example vehicle distributed by the systems shown in FIGS. 1 and 2 in accordance with various implementations.

Referring further to FIG. 3, in various forms, each vehicle of the plurality of vehicles 108*a* (e.g., as well as each new vehicle 108*b*) may be powered in a variety of ways, for example, with an electric motor and/or an internal combustion engine. The vehicles 108*a* may be any type of vehicle powered by an electric motor and/or an internal combustion engine such as a car, a truck, a robot, a plane and/or a boat, as non-limiting examples. Each of the vehicles 108*a* include a vehicle controller 300, one or more actuators 302, a plurality of on-board sensors 304, and a human machine interface (HMI) 306. Each of the vehicles 108*a* also have a reference point 308, that is, a specified point within the space defined by a vehicle body, for example, a geometrical center point at which respective longitudinal and lateral center axes of a particular vehicle of the plurality of vehicles 108*a* intersect. The reference point 308 identifies the location of the particular vehicle of the plurality of vehicles 108*a*, for example, a point at which the vehicles 108*a* are located as the vehicles 108*a* navigate toward a waypoint.

The vehicle controller 300, in some examples, is configured or programmed to control the operation of the plurality of vehicles' 108*a* brakes, propulsion (e.g., control of acceleration in the vehicle by controlling one or more of an internal combustion engine, electric motor, hybrid engine, etc.), steering, climate control, interior and/or exterior lights, etc., as well as to determine whether and when the vehicle controller 300, as opposed to a human operator, is to control such operations. It is understood that any of the operations associated with the vehicles 108*a* may be facilitated via an automated, a semi-automated, or a manual mode. For example, the automated mode may facilitate for any of the operations to be fully controlled by the vehicle controller 300 without the aid of a user. As another example, the semi-automated mode may facilitate for any of the operations to be at least partially controlled by the vehicle controller 300 and/or the user. As a further example, the manual mode may facilitate for any of the operations to be fully controlled by the user.

The vehicle controller 300 includes or may be communicatively coupled to (e.g., via a vehicle communications bus) one or more processors, for example, controllers or the like included in the vehicles 108*a* for monitoring and/or controlling various vehicle controllers, such as a powertrain controller, a brake controller, a steering controller, etc. The vehicle controller 300 is generally arranged for communications on a vehicle communication network that can include a bus in the vehicle 108*a* such as a controller area network (CAN) or the like, and/or other wired and/or wireless mechanisms.

The vehicle controller 300 transmits messages, via a vehicle network, to various devices in the vehicles 108*a* and/or receives messages from the various devices, for example, the one or more actuators 302, the HMI 306, etc. Alternatively, or additionally, in cases where the vehicle controller 300 includes multiple devices, the vehicle communication network is utilized for communications between devices represented as the vehicle controller 300 in this disclosure. Further, as discussed below, various other controllers and/or sensors provide data to the vehicle controller 200 via the vehicle communication network.

In addition, the vehicle controller 300 is configured for communicating through a wireless vehicular communication interface with other traffic objects (for example, vehicles, infrastructures, pedestrians, etc.), such as, via a vehicle-to-vehicle communication network. The vehicle controller 300 is also configured for communicating through a vehicle-to-infrastructure communication network, such as communicating with the infrastructure controller 304 of the infrastructure system 106. The vehicular communication network represents one or more mechanisms by which the vehicle controller 300 of the vehicles 108*a* communicate with other traffic objects, and may be one or more of wireless communication mechanisms, including any desired combination of wireless (e.g., cellular, wireless, satellite, microwave, and radio frequency) communication mechanisms and any desired network topology (or topologies when multiple communication mechanisms are utilized). Examples of vehicular communication networks include, among others, cellular, Bluetooth®, IEEE 802.11, dedicated short range communications (DSRC), and/or wide area networks (WAN), including the Internet, providing data communication services.

The vehicle actuators 302 are implemented via circuits, chips, or other electronic and/or mechanical components that can actuate various vehicle subsystems in accordance with appropriate control signals. The actuators 302 may be used to control braking, acceleration, and/or steering of the vehicles 108*a*. The vehicle controller 300 can be programmed to actuate the vehicle actuators 302 including propulsion, steering, and/or braking based on the planned acceleration or deceleration of the vehicles 108*a*.

The sensors 304 include a variety of devices to provide data to the vehicle controller 300. For example, the sensors 304 may include object detection sensors such as lidar sensor(s) disposed on or in the vehicles 108*a* that provide relative locations, sizes, and shapes of one or more targets surrounding the vehicles 108*a*, for example, additional vehicles, bicycles, pedestrians, robots, drones, etc., travelling next to, ahead, and/or behind the vehicles 108*a*. As another example, one or more of the sensors can be radar sensors affixed to one or more bumpers of the vehicles 108*a* that may provide locations of the target(s) relative to the location of each of the vehicles 108*a*.

The object detection sensors may include a camera sensor, for example, to provide a front view, side view, rear view, etc., providing images from an area surrounding the vehicles 108*a*. For example, the vehicle controller 300 may be programmed to receive sensor data from a camera sensor(s) and to implement image processing techniques to detect a road, infrastructure elements, etc. The vehicle controller 300 may be further programmed to determine a current vehicle location based on location coordinates, for example, GPS coordinates, received from the vehicles 108*a* and indicative of a location of the vehicles' 108*a* location from a GPS sensor.

The HMI 306 is configured to receive information from a user, such as a human operator, during operation of the vehicles 108*a*. Moreover, the HMI 306 is configured to present information to the user, such as, an occupant of one or more of the vehicles 108*a*. In some variations, the vehicle controller 300 is programmed to receive destination data, for example, location coordinates, from the HMI 306.

Accordingly, the vehicles 108*a* can be autonomously guided toward a waypoint using a combination of the infrastructure sensors 202 and the vehicle sensors (e.g., the onboard sensors 304). Routing can be done using vehicle location, distance to travel, queue in line for vehicle marshaling, etc. Vehicles 108*a* requiring additional charge/fuel can be prepped ahead of joining the queue. Other vehicles 108*a* destined to a particular waypoint operate in the same way, so that movement of an entire fleet can be coordinated. The movements of the entire fleet are coordinated through a central fleet-management system that directs all traffic and logistics from an assembly plant to the waypoint. For example, the entire fleet can be organized in a pre-sorted order.

The centralized fleet-management application in various examples has complete knowledge of the vehicles 108*a* in its control (for example, current location, destination, special notes, etc.), which adds accountability and traceability to the distribution process. The fleet-management is coordinated within and/or across sites to optimize delivery timing of each of the plurality of vehicles 108*a* to the waypoint. Several logistics applications can be used, which may involve a combination of an infrastructure system (e.g., the infrastructure system 106) integrated with a traffic-management algorithm to queue and deconflict vehicles in real-time. Accordingly, the fleet-management application queues vehicles 108*a* based on unique characteristics (how far does a particular vehicle of the plurality of vehicles 108*a* need to travel, what traffic is along the route, when does the particular vehicle of the plurality of vehicles 108*a* need to get to a particular location to line up in the correct order, etc.).

Figure 4:
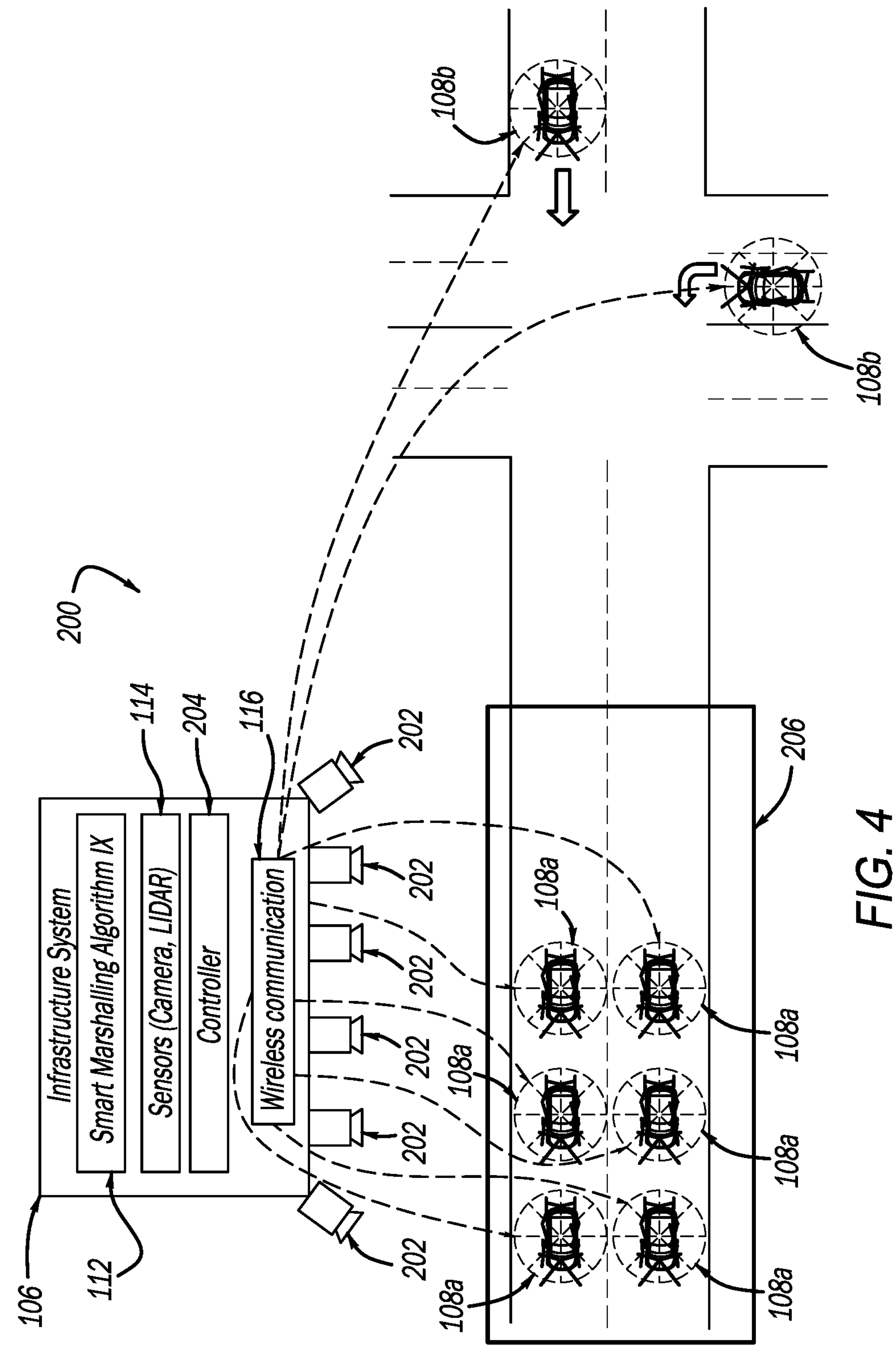
FIGS. 4-7 illustrate a new vehicle from a different location joining the current marshaling convoy zone of FIG. 2 in accordance with various implementations.

FIGS. 4-7 shows the engagement of the vehicles 108*a*, 108*b* with the infrastructure system 106 in an instance wherein the vehicles 108*a*, 108*b* are wirelessly communicative with the infrastructure system 106 and illustrates validation of marshaling instructions, in one example. With reference first to FIG. 4, each of the new vehicles 108*b* are able to receive the broadcasted marshaling infrastructure-message. Specifically, the new vehicles 108*b* can utilize V2X short range capabilities and long-range communication systems so that the new vehicles 108*b* can listen for the broadcasted marshaling infrastructure-message and be able to receive the broadcasted marshaling infrastructure-message. For example, the broadcasted marshaling infrastructure-messages received by the new vehicles 108*b* contain information pertaining to the marshaling zone area 206 and/or the types of marshaling that is presently occurring. As another example, the broadcasted marshaling infrastructure-messages received by the new vehicles 108*b* contain information pertaining to the types of marshaling, such as a convoy marshaling to a charge station, to end-of-line testing, to pickup/drop-off, etc. The types of marshaling presently occurring are received and processed by the vehicle-side smart marshaling algorithm 110. For example, the broadcasted marshaling infrastructure-messages received by the new vehicles 108*b* are broadcasted over the V2X protocol. However, it is understood that any communication means may be used to broadcast the broadcasted marshaling infrastructure-messages received by the new vehicles 108*b*. As another example, the vehicle-side smart marshaling algorithm 110 can cause the types of marshaling presently occurring to be projected onto the display screen of the new vehicles 108*b*. As another example, the vehicle-side smart marshaling algorithm 110 can cause the types of marshaling presently occurring to be passed to an automated vehicle marshaling (AVM) application (not shown) of the new vehicles 102*b*.

Figure 5:
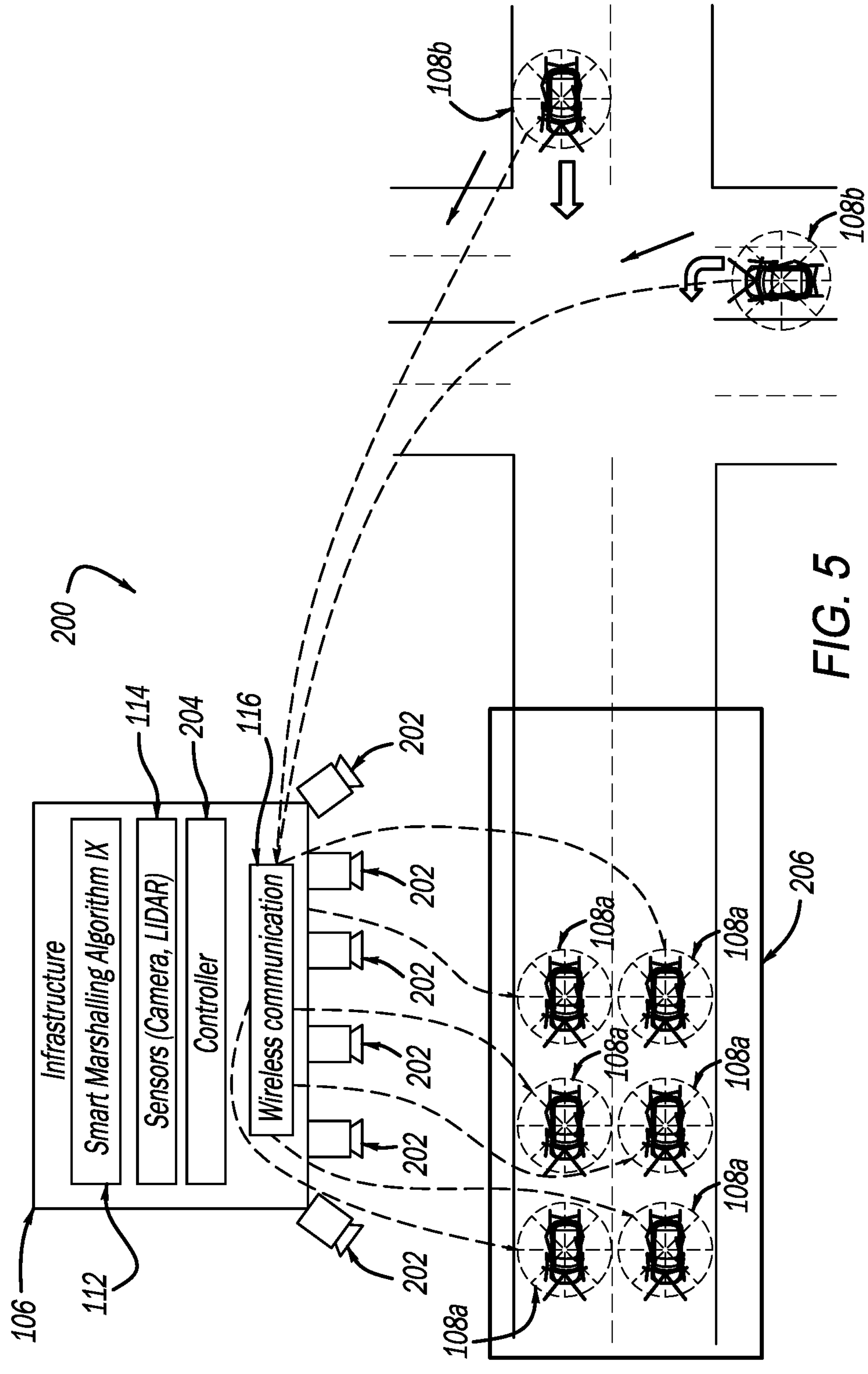

As illustrated in FIG. 5, the vehicle-side smart marshaling algorithm 110 is configured to receive and process input received from either a human operator or the AVM application regarding whether there is a desire and/or a need for the new vehicles 108*b* to join the plurality of vehicles 108*a*. In a case wherein there is a desire and/or a need for the new vehicles 108*b* to join the plurality of vehicles 108*a*, the vehicle-side smart marshaling algorithm 110 causes current location coordinates (e.g., latitude, longitude, elevation) of the new vehicles 108*b* to be broadcasted to the wireless communication component 116 of the infrastructure system 106 via a marshaling vehicle-message request. In the case wherein there is a desire and/or a need for the new vehicles 108*b* to join the plurality of vehicles 108*a*, the vehicle-side smart marshaling algorithm 110 also causes current vehicle location snap-shot information to be broadcasted to the wireless communication component 116 of the infrastructure system 106 via the marshaling vehicle-message request. For example, the vehicle location snap-shot information is obtained by using the onboard sensors 304 of the new vehicles 108*b*. It is understood that the current location coordinates and the current vehicle location snap-shot information may be sent alone, or in combination, to the wireless communication component 116 of the infrastructure system 106. As an additional example, the marshaling vehicle-message request is broadcasted over the V2X protocol. However, it is understood that any communication means may be used to broadcast the marshaling vehicle-message request.

Upon receipt of the marshaling vehicle-message request (s) including the current location coordinates and/or the current vehicle location snap-shot information associated with the new vehicles 108*b*, the IX-side smart marshaling algorithm 112 is configured to process the marshaling vehicle-message request(s). Specifically, the IX-side smart marshaling algorithm 112 is configured to process the marshaling vehicle-message request(s) in order to verify the current location coordinates and/or the current vehicle location snap-shot information associated with each of the new vehicles 108*b*. The IX-side smart marshaling algorithm 112 is further configured to determines a distance of each of the new vehicles 108*b* from an infrastructure system associated with the marshaling zone area 206. The IX-side smart marshaling algorithm 112 is also configured to generate routing-localization information to accommodate the inclusion of the new vehicles 108*b* within the marshaling convoy of the plurality of vehicles 108*a*. For example, the generation of the routing-localization information is based on the determination of the distance of each of the new vehicles 108*b* from the infrastructure system.

Figure 6:
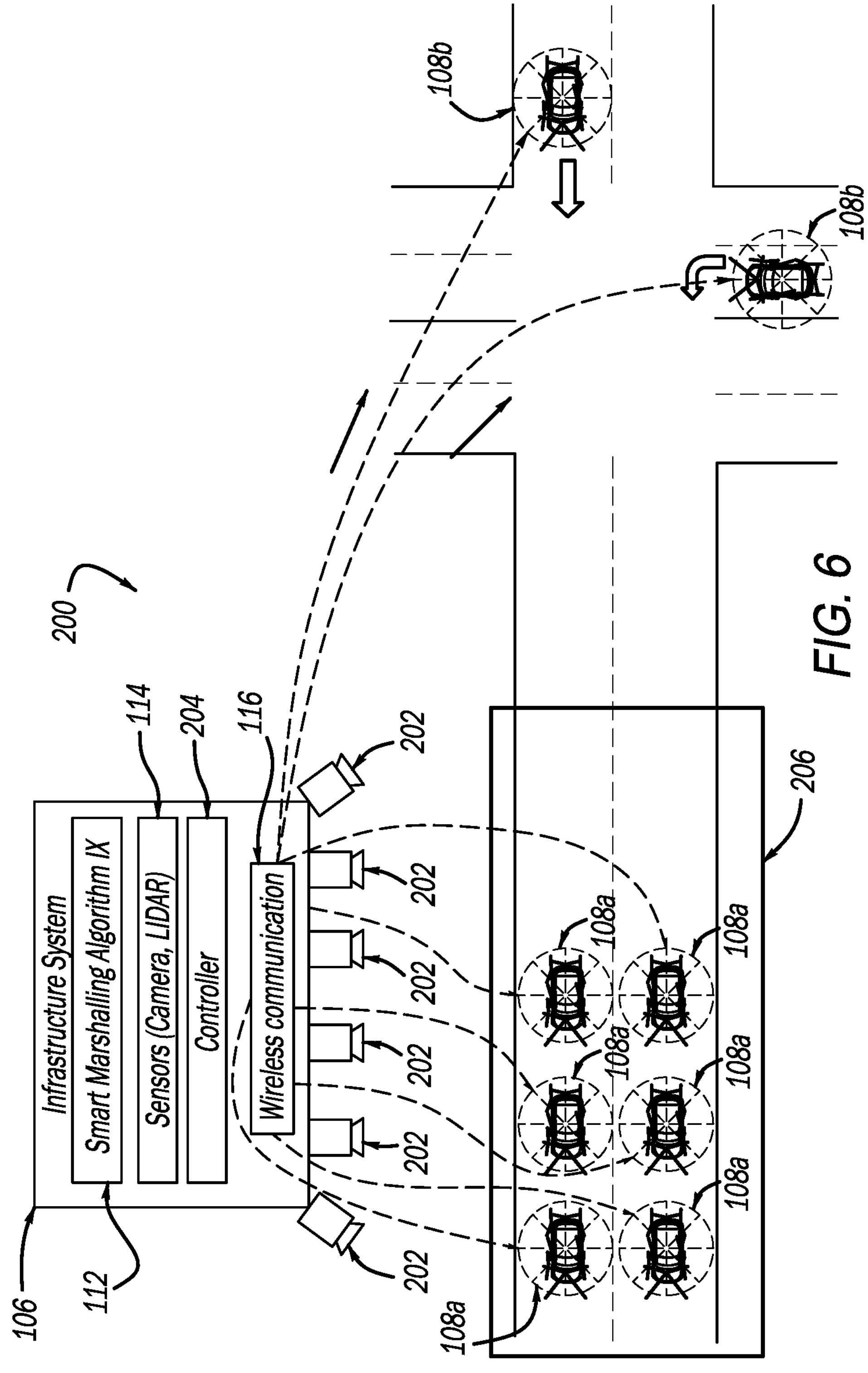

As is further illustrated in FIG. 6, the IX-side smart marshaling algorithm 112 is configured to cause the wireless communication component 116 of the infrastructure system 106 to broadcast the routing-localization information to the new vehicles 108*b* via a marshaling vehicle convoy acknowledgement message. For example, the routing-localization information is indicative of a route the new vehicles 108*b* can follow to join the existing marshaling convoy of the plurality of vehicles 108*a* from the new vehicles' 108*b* current location. As another example, the marshaling vehicle convoy acknowledgement message is broadcasted over the V2X protocol. However, it is understood that any communication means may be used to broadcast the marshaling vehicle convoy acknowledgement message. The marshaling vehicle convoy acknowledgement message includes instructions as to whether the new vehicles' 108*b* inclusion in the existing marshaling convoy is in an accepted status, a rejected status, or a stand-by status. For example, whether the new vehicles' 108*b* inclusion in the existing marshaling convoy is in an accepted status, a rejected status, or a stand-by status is based on the routing-localization information that indicates at what time adding the new vehicles 108*b* to the existing marshaling convoy (e.g., the plurality of vehicles 108*a*) is most efficient with respect to the progression of the marshaling convoy. However, other criteria can be used to define and/or determine the status.

Upon receipt of the marshaling vehicle convoy acknowledgement message including the routing-localization information, the vehicle-side smart marshaling algorithm 110 is configured to validate a permission associated with the routing-localization information. For example, the permission includes one or more instructions indicative of whether the new vehicles' 108*b* inclusion in the existing marshaling convoy is in an accepted status, a rejected status, or a stand-by status. In another example, if the permission indicates a stand-by status, the new vehicles' 108*b* wait for a particular time indicated by the routing-localization information before progressing to join the existing marshaling convoy. In an additional example, if the permission indicates a rejected status, the new vehicles 108*b* may broadcast another marshaling vehicle-message request. In yet another example, if the permission indicates an accepted status, the new vehicles can follow the route to join the existing marshaling convoy of the plurality of vehicles 108*a* indicated by the routing-localization information.

Figure 7:
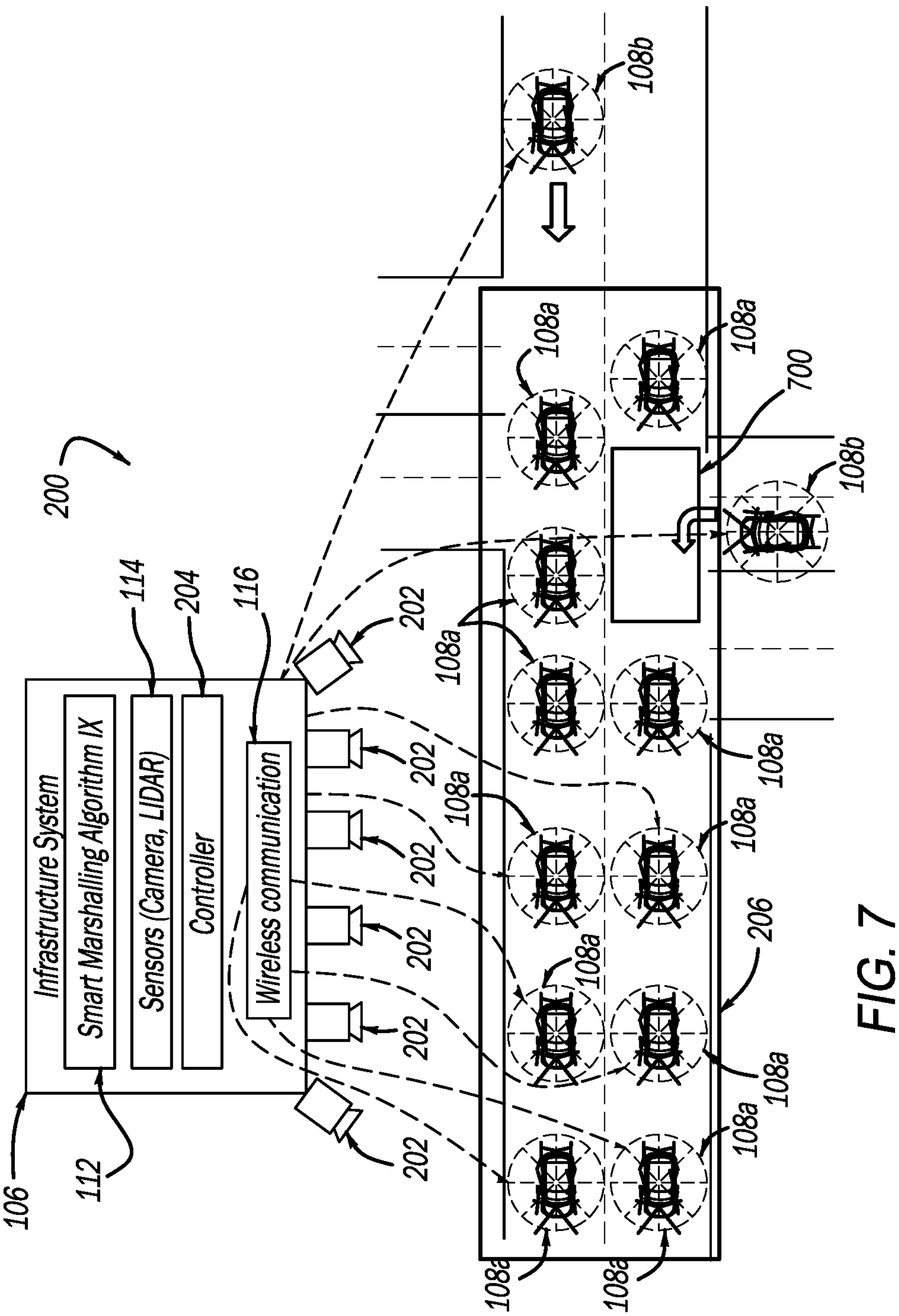

As is additionally illustrated in FIG. 7, and based on the accepted status and/or the new vehicles' 108*b* progression to join the existing marshaling convoy of the plurality of vehicles 108*a*, the IX-side smart marshaling algorithm 112 is configured to adjust the speed and/or the routing-localization of each of the vehicles of the existing marshaling convoy of the plurality of vehicles 108*a*. For example, adjustment to the speed and/or the routing-localization of each of the vehicles of the existing marshaling convoy of the plurality of vehicles 108*a* is to accommodate the new vehicles 108*b* to join the existing marshaling convoy with a smart negotiation method.

As part of the smart negotiation method, the IX-side smart marshaling algorithm 112 causes an intended path (e.g., a negotiation zone 700) to be advertised to each of the vehicles of the plurality of vehicles 108*a* of the existing marshaling convoy. The IX-side smart marshaling algorithm 112 also causes the negotiation zone 700 to be blocked off for the new vehicles 108*b*. For example, the negotiation zone 700 is advertised and blocked off so that the new vehicles 108*b* can minimize any routing and/or localization zone conflicts with any vehicles of the plurality of vehicles 108*a* of the existing marshaling convoy as the new vehicles 108*b* join the existing marshaling convoy. The new vehicles' 108*b* broadcasted communication to the wireless communication component 116 creates an unaltered blockchain record of the negotiation by creating a smart contract on each of the new vehicles 108*b*. Additionally, new vehicles' 108*b* broadcasted communication to the wireless communication component 116 creates an unaltered blockchain record of the negotiation by creating a smart contract on any road-side units (not shown) associated with the infrastructure system 106.

Figure 8A:
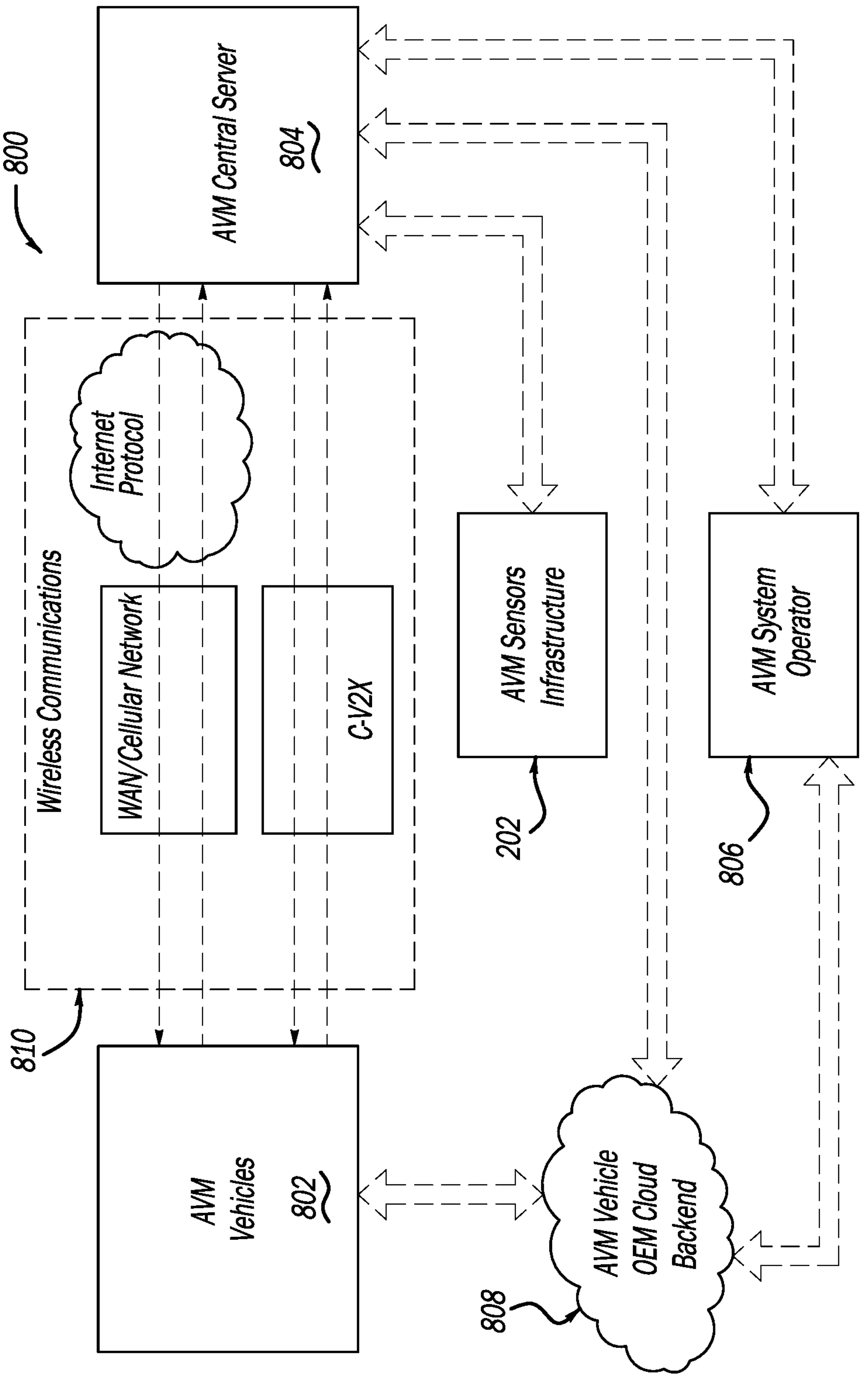
FIGS. 8A and 8B are block diagrams illustrating an example communication configuration of the system of FIG. 1 in accordance with various implementations.

Referring to FIG. 8A, an example communication architecture 800 for the system of at least FIGS. 1, 2, and 4-7 when marshaling one or more vehicles 108 having an AVM configuration is provided. In FIG. 8A, an AVM Vehicle 802 (e.g., AVM_V) is a vehicle equipped with a system for AVM operation. Additionally, an AVM Central Server 804 (e.g., AVM_CS) is a server that provides logical interface information received from the infrastructure sensors 202 to the one or more vehicles 108, where the logical interface could perform one or more of the following message exchanges: on-boarding session messages, park control infrastructure messages (PCIM), park control vehicle messages (PCVM), re-onboarding session messages, and/or off-boarding session messages. An AVM System Operator 806 (e.g., AVM_SO) is one or more persons that manage/supervise vehicle operation during the automated marshaling during the onboarding process, at individual locations, and/or an overall supervision via in-facility interfaces. Furthermore, an AVM Cloud Backend 808 (e.g., AVM_CB) is the vehicle OEM system that is configured for remote engagement and disengagement operations of AVM application associated with the one or more vehicles 108 utilizing the on-boarding, re-onboarding, off-boarding sessions messages. In one form, the infrastructure system 106 is the AVM central server 804, and may be referred to as an AVM Infrastructure (e.g., AVM_IX) which performs the localization functions such as detection, controls, and/or response of the vehicle. It is understood that any of the communications between each of the AVM vehicles 802, AVM central server 804, the AVM system operator 806, and the AVM cloud backend 808 pass through a wireless communication system 810. For example, the wireless communication system 810 facilitates communication between each of the AVM vehicles 802, AVM central server 804, the AVM system operator 806, and the AVM cloud backend 808 via a WAN/cellular network, an internet protocol, and/or a C-V2X protocol.

Figure 8B:
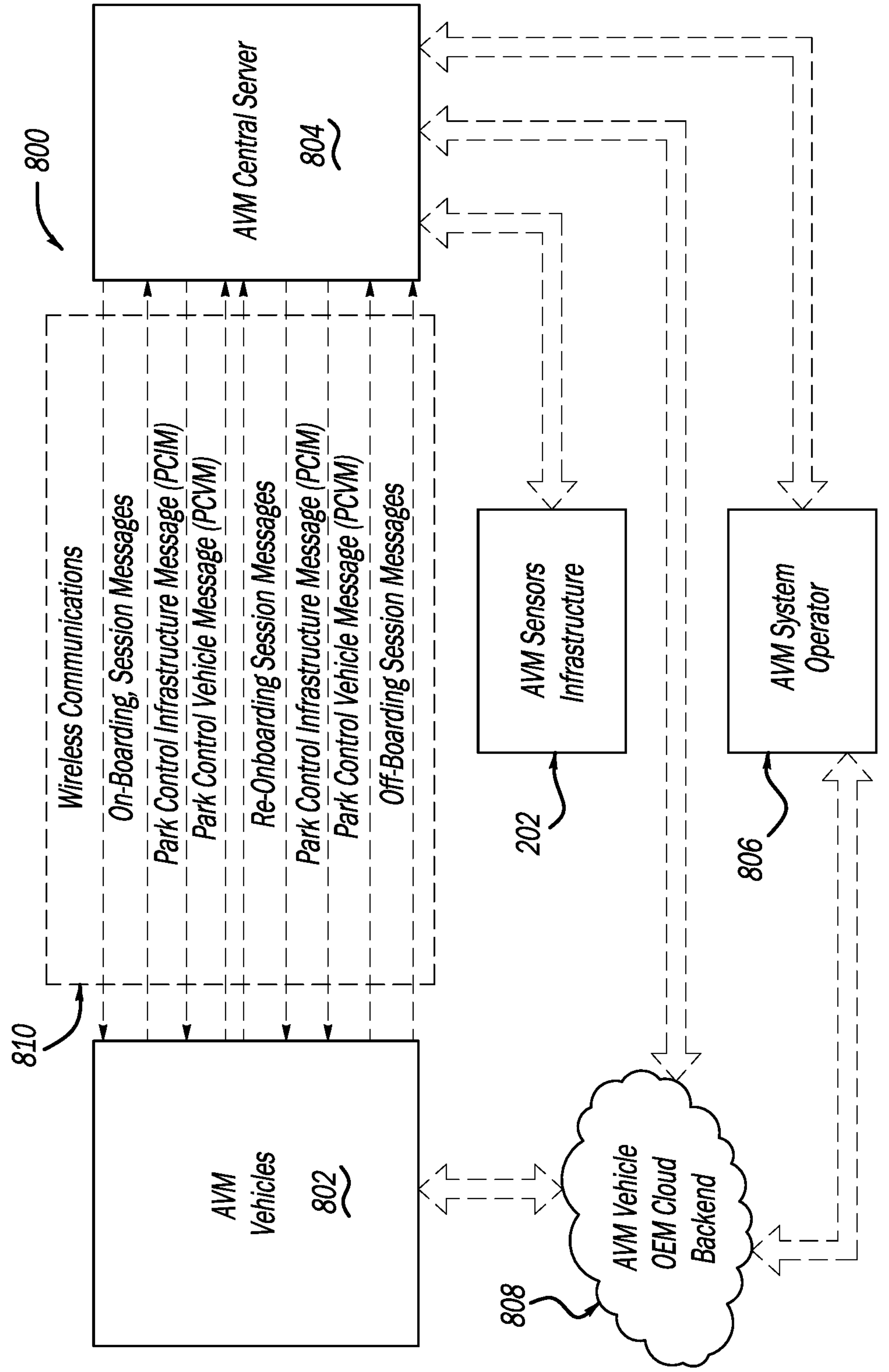

FIG. 8B illustrates an example message exchange between the one or more vehicles and the AVM central server 804. For example, on-boarding session messages are sent when a vehicle of the one or more vehicles 108 completes necessary authorization activities with the AVM server 804, which initiates the marshaling process. As another example, re-onboarding session messages are sent when a vehicle of the one or more vehicles 108 disengages for at least one certain action at a workstation for a certain time and then re-joins the marshaling (e.g., the marshaling convoy). As an additional example, off-boarding session messages are sent when a vehicle of the one or more vehicles 108 completes necessary de-authorization activities with the AVM server 804 and stops/discontinues from being marshaled (e.g., exits the marshaling convoy).

Figure 9:
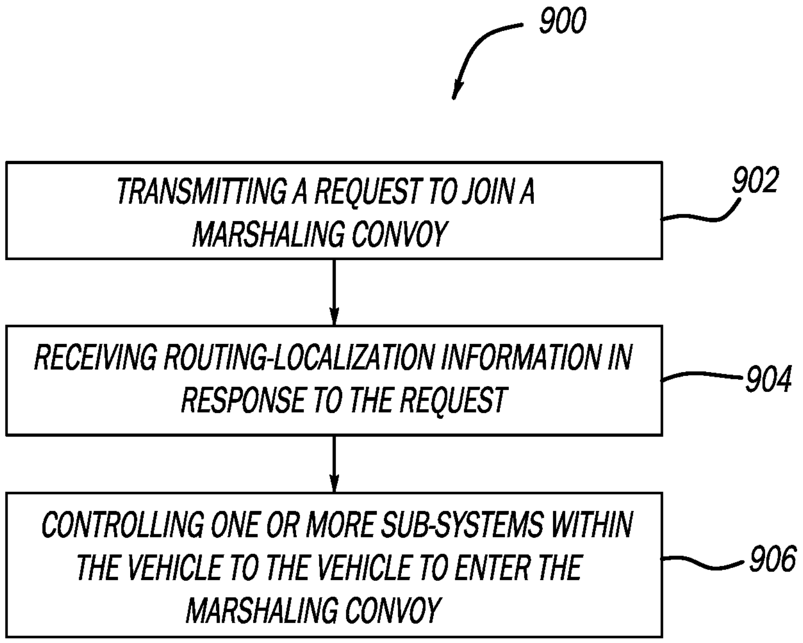
FIG. 9 is a flowchart illustrating an example method for marshaling one or more vehicles in accordance with various implementations.

FIG. 9 is a flowchart illustrating an example method 900 for joining an existing automated vehicle marshaling convoy using wireless communication in accordance with various implementations. At operation 902, a request to join a marshaling convoy (e.g., the plurality of vehicles 108*a*) is transmitted. For example, the request to join the marshaling convoy is made by a vehicle system of a vehicle (e.g., the new vehicle(s) 108*b*) to an infrastructure system (e.g., the infrastructure system 106). As another example, the request is transmitted via a wireless communication system (e.g., the wireless communication system 810. As a further example, the request identifies a current location of the vehicle, snap-shot information associated with the current location of the vehicle, or a combination thereof. As yet another example, the current location of the vehicle and/or the snap-shot information associated with the current location of the vehicle is identified by using one or more vehicle sensors (e.g., the onboard sensors 304) of the vehicle.

At operation 904, routing-localization information is received. For example, the routing-localization information is received in response to the request to join the marshaling convoy. As another example, the vehicle system receives the routing-localization information from the infrastructure system. As an additional example, the routing-localization information provides a route for the vehicle to join the marshaling convoy. As yet another example, the routing-localization information is calculated based on a distance of the vehicle from a marshaling zone area. The marshaling zone area includes the marshaling convoy, for example.

At operation 906, one or more sub-systems (e.g., the vehicle-side smart marshaling algorithm 110, the wireless communication module 118, the vehicle central gateway module 120, the vehicle infotainment system 122, the one or more vehicle sensors 124, the vehicle battery 126, the vehicle GNSS 128, the vehicle navigation maps 130, and the vehicle CAN bus 132) within the vehicle are controlled. For example, the one or more sub-systems are controlled to cause the vehicle to enter the marshaling convoy based on the routing-localization information and/or a marshaling message. As another example, the marshaling message causes the marshaling convoy to accommodate the vehicle. As a further example, the one or more sub-systems are controlled by the vehicle system. As yet another example, the control of the one or more sub-systems within the vehicle to cause the vehicle to enter the marshaling convoy is further based on a permission indicative of an accepted status. The permission indicative of the accepted status is received from the infrastructure system, for example.

In an embodiment, a current marshaling infrastructure message is identified. For example, the current marshaling infrastructure message is identified by a smart marshaling algorithm of the vehicle. Based on the identification of the current marshaling infrastructure message, data indicative of a type of marshaling that is associated with the marshaling convoy is displayed. In another embodiment, a permission associated with the routing-localization information is validated. For example, the permission includes one or more instructions indicative of whether the request is in one of the accepted status, a rejected status, or a stand-by status.

Thus, one or more examples provide for the marshaling of a convoy of vehicles by an infrastructure system, wherein the infrastructure system wirelessly communicates with additional vehicles outside the convoy of vehicles to facilitate a route for the additional vehicles to join the convoy of vehicles.

Unless otherwise expressly indicated herein, all numerical values indicating mechanical/thermal properties, compositional percentages, dimensions and/or tolerances, or other characteristics are to be understood as modified by the word "about" or "approximately" in describing the scope of the present disclosure. This modification is desired for various reasons including industrial practice, material, manufacturing, and assembly tolerances, and testing capability.

As used herein, the phrase at least one of A, B, and C should be construed to mean a logical (A OR B OR C), using a non-exclusive logical OR, and should not be construed to mean "at least one of A, at least one of B, and at least one of C."

In this application, the term "controller" and/or "module" may refer to, be part of, or include: an Application Specific Integrated Circuit (ASIC); a digital, analog, or mixed analog/digital discrete circuit; a digital, analog, or mixed analog/digital integrated circuit; a combinational logic circuit; a field programmable gate array (FPGA); a processor circuit (shared, dedicated, or group) that executes code; a memory circuit (shared, dedicated, or group) that stores code executed by the processor circuit; other suitable hardware components (e.g., op amp circuit integrator as part of the heat flux data module) that provide the described functionality; or a combination of some or all of the above, such as in a system-on-chip.

The term memory is a subset of the term computer-readable medium. The term computer-readable medium, as used herein, does not encompass transitory electrical or electromagnetic signals propagating through a medium (such as on a carrier wave); the term computer-readable medium may therefore be considered tangible and non-transitory. Non-limiting examples of a non-transitory, tangible computer-readable medium are nonvolatile memory circuits (such as a flash memory circuit, an erasable programmable read-only memory circuit, or a mask read-only circuit), volatile memory circuits (such as a static random access memory circuit or a dynamic random access memory circuit), magnetic storage media (such as an analog or digital magnetic tape or a hard disk drive), and optical storage media (such as a CD, a DVD, or a Blu-ray Disc).

The apparatuses and methods described in this application may be partially or fully implemented by a special purpose computer created by configuring a general-purpose computer to execute one or more particular functions embodied in computer programs. The functional blocks, flowchart components, and other elements described above serve as software specifications, which can be translated into the computer programs by the routine work of a skilled technician or programmer.

The description of the disclosure is merely exemplary in nature and, thus, variations that do not depart from the substance of the disclosure are intended to be within the scope of the disclosure. Such variations are not to be regarded as a departure from the spirit and scope of the disclosure.

What is claimed is:

1. A method comprising:

transmitting, by a vehicle system of a vehicle to an infrastructure system, a request to join a marshaling convoy, wherein the request is transmitted via a wireless communication system;

receiving, by the vehicle system from the infrastructure system, routing-localization information in response to the request, wherein the routing-localization information provides a route for the vehicle to join the marshaling convoy; and controlling, by the vehicle system, one or more subsystems within the vehicle to cause the vehicle to enter the marshaling convoy based on the routing-localization information and a marshaling message, wherein the marshaling message causes the marshaling convoy to accommodate the vehicle, wherein the marshaling message is broadcasted by the infrastructure system to vehicles within a marshaling zone area, wherein the marshaling message includes information related to the marshaling zone area and a type of marshaling that is presently occurring and associated with the marshaling convoy, and wherein the type of marshaling comprises a plant marshalling, a depot marshalling, a valet parking assist marshalling, an electric vehicle charging marshalling, a geo-fenced use, or an end-of-line testing.

2. The method of claim 1, wherein the request identifies, by using one or more vehicle sensors of the vehicle, a current location of the vehicle, snap-shot information associated with the current location of the vehicle, or a combination thereof.

3. The method of claim 1, wherein the routing-localization information is calculated based on a distance of the vehicle from a marshaling zone area, wherein the marshaling zone area includes the marshaling convoy.

4. The method of claim 1, further comprising:

identifying, by a smart marshaling algorithm of the vehicle, a current marshaling infrastructure message; and displaying data indicative of the type of marshaling associated with the marshaling convoy, wherein the display of the data is based on the identification of the current marshaling infrastructure message.

5. The method of claim 1, further comprising:

validating a permission associated with the routing-localization information, wherein the permission includes one or more instructions indicative of whether the request is in one of an accepted status, a rejected status, or a stand-by status.

6. The method of claim 1, wherein the control of the one or more sub-systems within the vehicle to cause the vehicle to enter the marshaling convoy is further based on a permission, received from the infrastructure system, indicative of an accepted status.

7. A system comprising:

an infrastructure system configured to:

receive a request to join a marshaling convoy, wherein the request is received via a wireless communication system, and transmit routing-localization information in response to the request, wherein the routing-localization information provides a route for a vehicle to join the marshaling convoy; and a vehicle system configured to:

transmit the request to join the marshaling convoy, receive the routing-localization information in response to the request, and control one or more sub-systems within the vehicle to cause the vehicle to enter the marshaling convoy based on the routing-localization information and a marshaling message, wherein the marshaling message causes the marshaling convoy to accommodate the vehicle, wherein the marshaling message is broadcasted by the infrastructure system to vehicles within a marshaling zone area, wherein the marshaling message includes information related to the marshaling zone area and a type of marshaling that is presently occurring and associated with the marshaling convoy, and wherein the type of marshaling comprises a plant marshalling, a depot marshalling, a valet parking assist marshalling, an electric vehicle charging marshalling, a geo-fenced use, or an end-of-line testing.

8. The system of claim 7, wherein the request identifies, by using one or more vehicle sensors of the vehicle, a current location of the vehicle, snap-shot information associated with the current location of the vehicle, or a combination thereof.

9. The system of claim 7, wherein the infrastructure system is further configured to:

determine, based on a distance of the vehicle from a marshaling zone area, the routing-localization information, wherein the marshaling zone area includes the marshaling convoy.

10. The system of claim 7, wherein the vehicle system is further configured to:

identify, by a smart marshaling algorithm of the vehicle, a current marshaling infrastructure message; and display data indicative of the type of marshaling associated with the marshaling convoy, wherein the display of the data is based on the identification of the current marshaling infrastructure message.

11. The system of claim 7, wherein the vehicle system is further configured to:

validate a permission associated with the routing-localization information, wherein the permission includes one or more instructions indicative of whether the request is in one of in an accepted status, a rejected status, or a stand-by status.

12. The system of claim 7, wherein the control of the one or more sub-systems within the vehicle to cause the vehicle to enter the marshaling convoy is further based on a permission, received from the infrastructure system, indicative of an accepted status.

13. The system of claim 7, wherein the infrastructure system is further configured to:

generate the marshaling message for current vehicles in the marshaling convoy; and transmit the marshaling message to the vehicle system, wherein the transmission of the marshaling message is based on the generation of the marshaling message.

14. The system of claim 7, wherein the marshaling message causes a speed and routing-localization of current marshaling vehicles of the marshaling convoy to be adjusted, and wherein the marshaling message creates an unaltered smart contract of a marshaling convoy negotiation.

15. One or more non-transitory computer-readable media storing processor-executable instructions that, when executed by at least one processor, cause the at least one processor to:

transmit, by a vehicle system of a vehicle to an infrastructure system, a request to join a marshaling convoy, wherein the request is transmitted via a wireless communication system;

receive, by the vehicle system from the infrastructure system, routing-localization information in response to the request, wherein the routing-localization information provides a route for the vehicle to join the marshaling convoy; and control, by the vehicle system, one or more sub-systems within the vehicle to cause the vehicle to enter the marshaling convoy based on the routing-localization information and a marshaling message, wherein the marshaling message causes the marshaling convoy to accommodate the vehicle, wherein the marshaling message is broadcasted by the infrastructure system to vehicles within a marshaling zone area, wherein the marshaling message includes information related to the marshaling zone area and a type of marshaling that is presently occurring and associated with the marshaling convoy, and wherein the type of marshaling comprises a plant marshalling, a depot marshalling, a valet parking assist marshalling, an electric vehicle charging marshalling, a geo-fenced use, or an end-of-line testing.

16. The one or more non-transitory computer-readable media of claim 15, wherein the request identifies, by using one or more vehicle sensors of the vehicle, a current location of the vehicle, snap-shot information associated with the current location of the vehicle, or a combination thereof.

17. The one or more non-transitory computer-readable media of claim 15, wherein the routing-localization information is calculated based on a distance of the vehicle from a marshaling zone area, wherein the marshaling zone area includes the marshaling convoy.

18. The one or more non-transitory computer-readable media of claim 15, wherein the at least one processor is further caused to:

identify, by a smart marshaling algorithm of the vehicle, a current marshaling infrastructure message; and display data indicative of the type of marshaling associated with the marshaling convoy, wherein the display of the data is based on the identification of the current marshaling infrastructure message.

19. The one or more non-transitory computer-readable media of claim 15, wherein the at least one processor is further caused to:

validate a permission associated with the routing-localization information, wherein the permission includes one or more instructions indicative of whether the request is in one of an accepted status, a rejected status, or a stand-by status.

20. The one or more non-transitory computer-readable media of claim 15, wherein the control of the one or more sub-systems within the vehicle to cause the vehicle to enter the marshaling convoy is further based on a permission, received from the infrastructure system, indicative of an accepted status.

* * * * *